(12) United States Patent
Kim (10) Patent No.: US 9,193,406 B2
(45) Date of Patent: Nov. 24, 2015

(54) ANGLE ADJUSTING DEVICE FOR BICYCLE SADDLE

(76) Inventor: Chun-Choo Kim, Seoul (KR)

( * ) Notice: Subject to any disclaimer, the term of this patent is extended or adjusted under 35 U.S.C. 154(b) by 0 days.

(21) Appl. No.: 13/438,272

(22) Filed: Apr. 3, 2012

(65) Prior Publication Data

US 2013/0093223 A1    Apr. 18, 2013

Related U.S. Application Data

(62) Division of application No. 12/679,480, filed as application No. PCT/KR2007/006896 on Dec. 27, 2007.

(30) Foreign Application Priority Data

Oct. 16, 2007    (KR) .................. 10-2007-0104122

(51) Int. Cl.
*B62J 1/08* (2006.01)

(52) U.S. Cl.
CPC ......................... *B62J 1/08* (2013.01)

(58) Field of Classification Search
USPC ............. 297/195.1, 195.11, 215.15, 328, 461
See application file for complete search history.

(56) References Cited

U.S. PATENT DOCUMENTS

| | | | |
|---|---|---|---|
| 4,568,121 A | | 2/1986 | Kashima |
| 5,029,799 A | * | 7/1991 | Bernier .......................... 248/514 |
| 5,244,301 A | | 9/1993 | Kurke et al. |
| 5,265,969 A | * | 11/1993 | Chuang ........................... 403/94 |
| 5,364,160 A | * | 11/1994 | Fritschen et al. .......... 297/195.1 |
| 5,727,583 A | * | 3/1998 | Kennedy ....................... 135/20.1 |
| 6,176,459 B1 | * | 1/2001 | Wilcox et al. ................. 248/371 |
| 6,533,237 B1 | * | 3/2003 | Matusek ........................ 248/514 |
| 7,296,857 B2 | * | 11/2007 | Shinozaki et al. ............ 297/365 |
| 2005/0146173 A1 | | 7/2005 | Saccucci |

FOREIGN PATENT DOCUMENTS

| | | | |
|---|---|---|---|
| JP | 11347171 | * | 12/1999 |
| KR | 2004-330815 | | 11/2004 |

OTHER PUBLICATIONS

International Search Report for PCT/KR2007/006896 mailed Jul. 16, 2008.

* cited by examiner

*Primary Examiner* — Peter Brown
(74) *Attorney, Agent, or Firm* — Revolution IP, PLLC (57) ABSTRACT

An angle adjusting device for a bicycle saddle is disclosed. The device includes a frame coupling block, which is coupled at a lower end thereof to an upper portion of a height adjustment unit. A saddle coupling post is coupled at a lower end thereof to an upper end of the frame coupling block and is coupled at an upper end thereof to the saddle, with a through hole formed in the upper portion of the saddle coupling post. An angle fixing unit includes a pair of fan-shaped plates attached to left and right sides of the frame coupling block, and a pair of rectangular plates coupling front and rear edges of the fan-shaped plates to each other. An angle adjusting unit is coupled to the saddle coupling post, and is detachable from holes in the angle fixing unit to control the rotation of the saddle coupling post.

3 Claims, 7 Drawing Sheets

ANGLE ADJUSTING DEVICE FOR BICYCLE SADDLE

RELATED APPLICATIONS

This application is a divisional of U.S. patent application Ser. No. 12/679,480, filed Mar. 22, 2010, which is a 371 application of International Application No. PCT/KR2007/006896, filed Dec. 27, 2007, which in turn claims priority from Korean Patent Application No. 10-2007-0104122, filed Oct. 16, 2007, all of which are incorporated herein by reference in their entireties.

TECHNICAL FIELD

The present invention relates, in general, to a device for adjusting the position of a bicycle saddle and, more particularly, to an angle adjusting device for a bicycle saddle, which is coupled to the upper portion of a structure for adjusting the height of the saddle so as to adjust the angle of the bicycle saddle as desired, thus allowing the angle of the saddle to be changed so that the saddle can be appropriately positioned relative to the pedals and handlebars, depending on the size of a user's body.

BACKGROUND ART

Generally, bicycles are vehicles that are moved by pushing pedals with two feet. In a broad sense, bicycles include vehicles having three or four wheels and vehicles moving in places other than the ground, for example, a water bicycle or an ice bicycle. Bicycles are widely used as representative transportation means using human power. Recently, bicycles have been used as sports equipment for the promotion of health, and in addition, have been widely applied as recreation means. Further, due to the environment-friendly characteristics of bicycles, the demand for bicycle has steadily increased.

A conventional bicycle includes wheels, a frame, pedals, a chain, a saddle, handlebars, and other parts. Generally, the bicycle is provided with a height adjustment unit for adjusting the height of the saddle at the junction between the saddle and the frame. Thus, even if users of various heights ride the bicycle, the height of the saddle can be adjusted to be appropriate for the height of the user so that his or her feet comfortably reach the pedals. As a result, the user can ride the bicycle stably.

As such, in the conventional bicycle, the height of the saddle may be adjusted in a vertical direction so that the interval between the user's feet and the pedals can be adjusted. However, even if people are the same height or their legs are the same length, the lengths of their upper bodies or arms may be different from each other. Thus, when the length of one's legs is much greater than the average length, and the height of the saddle is adjusted according to the length of the legs, it will be difficult to grip the handlebars with the hands. Conversely, when the legs are short, the arms must be bent when gripping the handlebars. In these cases, it is inconvenient to ride the bicycle for a lengthy period of time.

Further, when a user goes up or down a steep hill while riding the bicycle, his or her body leans toward the front or rear portion of the bicycle. At this time, because the angle of the saddle is fixed, the user is uncomfortable, so he or she frequently stands up rather than remaining on the saddle. However, when the user stands up and puts his or her weight only on the pedals, stability is low and the possibility of accidents is thus increased. Further, while the user goes up and down a hill for a lengthy period of time, he or she must continue standing up, which is fatiguing.

DISCLOSURE

Technical Problem

Accordingly, an embodiment of the present invention has been made keeping in mind the above problems occurring in the prior art, and an aspect of the present invention is to provide an angle adjusting device for a bicycle saddle, in which a fan-shaped structure for adjusting the angle of the saddle is coupled to the upper portion of a structure for adjusting the height of the saddle, thus allowing the angle of the saddle to be changed so that the saddle can be positioned appropriately relative to the pedals and handlebars, depending on the length of a user's body or the place where the bicycle travels.

Technical Solution

In order to accomplish the above aspect, an embodiment of the present invention provides a saddle angle adjusting device for a bicycle having a height adjustment unit between a frame and a saddle, the saddle angle adjusting device including a frame coupling block which is coupled at a lower end thereof to an upper portion of the height adjustment unit, a saddle coupling post which is coupled at a lower end thereof to an upper end of the frame coupling block in such a way that the saddle coupling post rotates forwards and backwards, and which is coupled at an upper end of the saddle coupling post to the saddle, with a through hole formed in an upper portion of the saddle coupling post, an angle fixing unit which includes a pair of fan-shaped plates attached to left and right sides of the frame coupling block, and a pair of rectangular plates respectively coupling front and rear edges of the fan-shaped plates to each other, with a plurality of holes formed along an arc of each of the fan-shaped plates, and an angle adjusting unit which is coupled to the saddle coupling post, a predetermined part of the angle adjusting unit being detachable from the holes in the angle fixing unit to control rotation of the saddle coupling post.

Advantageous Effects

According to an embodiment of the present invention, an angle adjusting device for a bicycle saddle is constructed so that a fan-shaped structure for adjusting the angle of the saddle is coupled to the upper portion of a structure for adjusting the height of the saddle, thus allowing the angle of the saddle to be adjusted as desired, therefore allowing even a user who has longer legs or arms than average people to comfortably ride a bicycle.

Further, an angle adjusting device according to an embodiment of the present invention adjusts the angle of a saddle to be appropriately adjusted when a user goes up and down a steep slope, thus allowing him or her to comfortably travel on the steep slope while sitting on the saddle.

MODE FOR EMBODIMENTS

Hereinafter, angle adjusting devices for bicycle saddles according to embodiments of the present invention will be described in detail.

Figure 1:
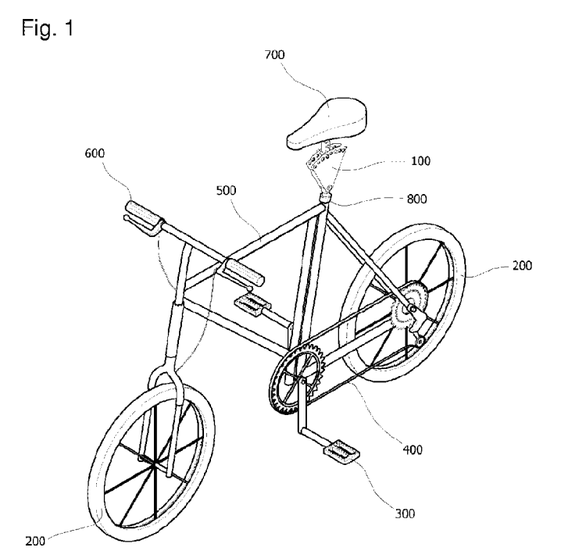
FIG. 1 is a perspective view showing a bicycle having a saddle angle adjusting device, according to a first embodiment of the present invention.

FIG. 1 is a perspective view showing a bicycle having a saddle angle adjusting device, according to a first embodiment of the present invention.

Figure 2:
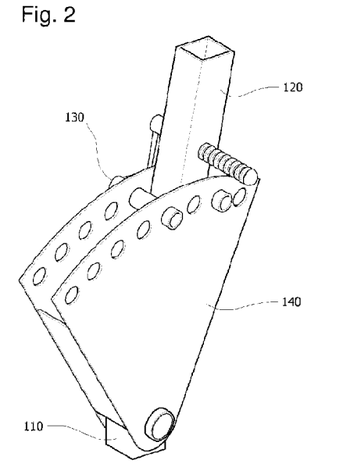
FIG. 2 is a detailed perspective view showing the saddle angle adjusting device of FIG. 1.

As shown in FIG. 2, a saddle angle adjusting device 100 according to the first embodiment of the present invention is installed between a saddle 700 and a height adjustment unit 800 of the bicycle, and functions to adjust the angle of the saddle 700 as desired. The bicycle includes wheels 200, pedals 300, a chain 400, a frame 500, handlebars 600, the saddle 700, and the height adjustment unit 800. The wheels 200 spin on the ground, thus moving the bicycle. The pedals 300 are pushed with a user's feet and thus rotated. The chain 400 transmits the rotation from the pedals 300 to the wheels 200. The pedals 300 and the chain 400 are mounted to the frame 500. The handlebars 600 are installed at the upper portion of the front of the frame 500, and are used for steering the bicycle. The saddle 700 is installed at the upper portion of the rear of the frame 500 to enable a user to sit thereon. The height adjustment unit 800 is provided between the frame 500 and the saddle 700, and functions to adjust the height of the saddle.

Figure 3:
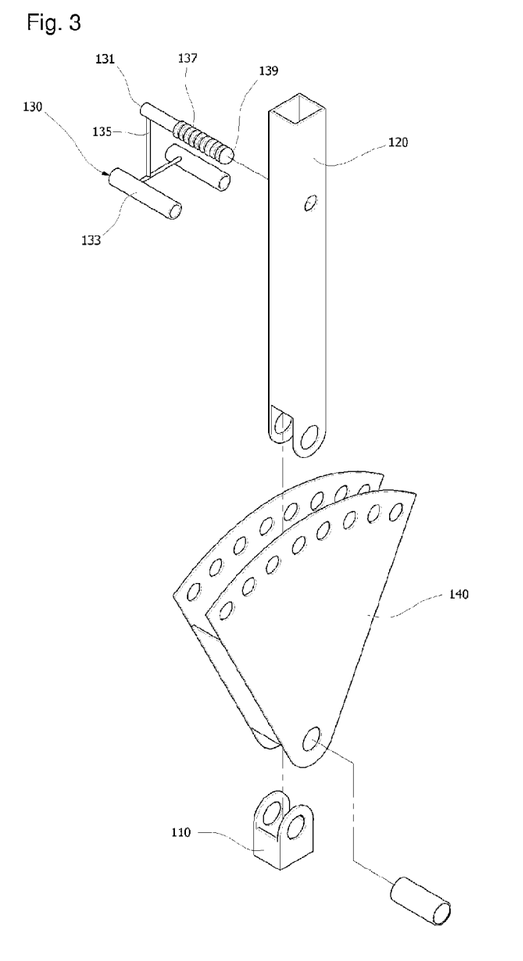
FIG. 3 is an exploded perspective view showing the saddle angle adjusting device of FIG. 1.

As shown in FIG. 3, the saddle angle adjusting device 100 includes a frame coupling block 110, a saddle coupling post 120, an angle adjusting unit 130, and an angle fixing unit 140.

The frame coupling block 110 is coupled at the lower end thereof to the upper portion of the height adjustment unit 800. The saddle coupling post 120 is coupled to the upper end of the frame coupling block 110, and the angle fixing unit 140 is positioned outside the saddle coupling post 120 and is coupled to the upper end of the frame coupling block 110.

The saddle coupling post 120 is coupled at the lower end thereof to the upper end of the frame coupling block 110, and is coupled at the upper end thereof to the saddle 700. A through hole is formed through the upper portion of the saddle coupling post 120, so that the angle adjusting unit 130 is coupled to the saddle coupling post 120 via the through hole. The saddle coupling post 120 may rotate forwards and backwards around the lower end thereof, which is coupled to the upper end of the frame coupling block 110.

The angle adjusting unit 130 includes a coupling rod 131, one or more angle fixing rods 133, a link 135, an elastic member 137, and a stopper 139. The coupling rod 131 is inserted into the saddle coupling post 120. The angle fixing rods 133 are inserted into the angle fixing unit 140. The link 135 connects the coupling rod 131 to the angle fixing rods 133. The elastic member 137 is fitted over the coupling rod 131, so that the coupling rod 131 is in close contact with the saddle coupling post 120. The stopper 139 is mounted to one end of the coupling rod 131 in order to support the elastic member 137.

Figure 4:
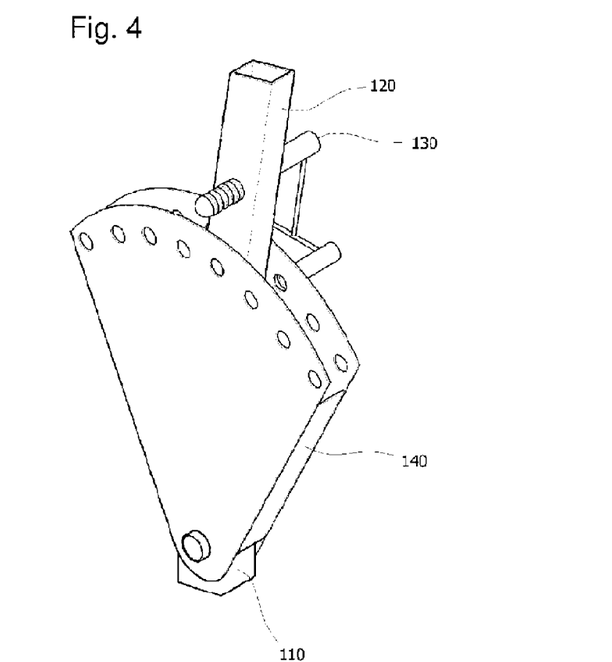
FIG. 4 is a perspective view showing the state in which a coupling rod is moved from the position of FIG. 2 to change the angle of a saddle.
Figure 5:
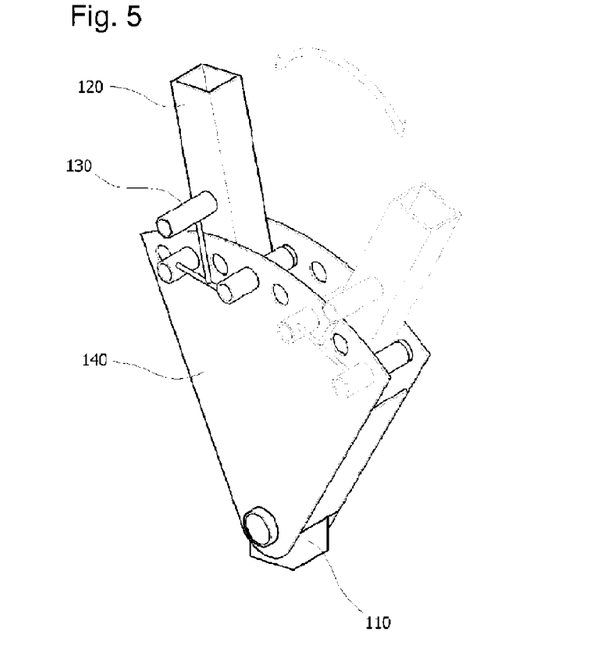
FIG. 5 is a view showing the state in which a saddle coupling post is moved from the position of FIG. 2, so that the angle of the saddle coupling post is changed.

The angle adjusting unit 130 is operated as follows. When the coupling rod 131, inserted into the saddle coupling post 120 as shown in FIG. 2, is pulled in the direction of the link 135, as shown in FIG. 4, the angle fixing rods 133, which are connected to the link 135, are removed from the angle fixing unit 140. Thereby, as shown in FIG. 5, the saddle coupling post 120 may be moved forwards and backwards. In such a state, it is possible to adjust the angle of the saddle coupling post 120 as desired. When the saddle coupling post 120 is set to a desired angle, and thereafter, force pulling the coupling rod 131 is eliminated, the coupling rod 131 is moved in the direction of the stopper 139 by the elastic force of the elastic member 137. Simultaneously, the angle fixing rods 133 are inserted into the angle fixing unit 140, thus holding the saddle coupling post 120 at the adjusted angle.

Figure 6:
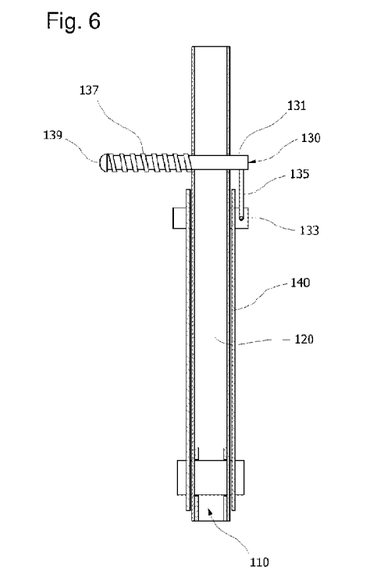
FIG. 6 is a side sectional view of FIG. 2.

As shown in FIG. 6, the coupling rod 131 is inserted into the through hole of the saddle coupling post 120. One end of the coupling rod 131 is coupled to the link 135, while the other end of the coupling rod 131 is coupled to the stopper 139. The elastic member 137 is positioned between the stopper 139 and the saddle coupling post 120 in such a way as to surround the coupling rod 131.

Each angle fixing rod 133 is constructed so that one end of the angle fixing rod 133 is connected to the link 135, and the other end is inserted into the angle fixing unit 140. The angle fixing rod 133 may comprise two angle fixing rods, as shown in FIG. 3. However, the angle fixing rod 133 may be one, three or more in number.

Figure 7:
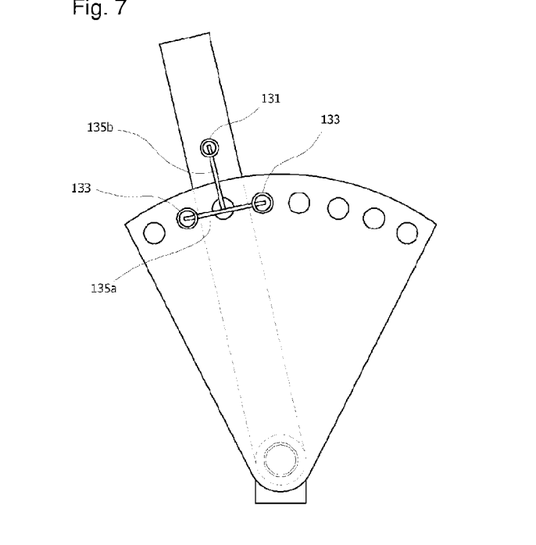
FIG. 7 is a rear view showing the saddle angle adjusting device of FIG. 1.

As shown in FIG. 7, the link 135 may include a cross bar 135a, which connects the angle fixing rods 133 to each other, and a vertical bar 135b, which connects the cross bar 135a to the coupling rod 131. Alternatively, the link 135 may have a triangular configuration, which includes a cross bar for connecting the angle fixing rods 133 to each other, and diagonal bars for connecting the angle fixing rods 133 to the coupling rod 131. As long as the link 135 connects the coupling rod 131 to one end of each angle fixing rod 133, any shape of link is possible.

Figure 8:
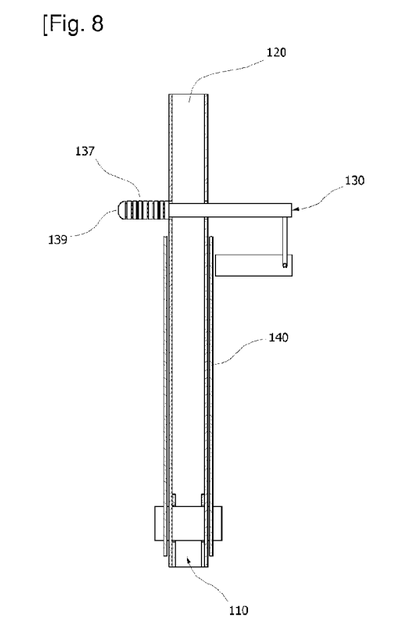
FIG. 8 is a side sectional view of FIG. 4.

The elastic member 137 is made of an elastic material, and comprises a spring, one end of which is in contact with the stopper 139, and the other end of which is in contact with the saddle coupling post 120. The spring surrounds the coupling rod 131. When the coupling rod 131 is pulled in a direction of the link 135, as shown in FIG. 8, the elastic member 137 is compressed. Meanwhile, when force pulling the coupling rod 131 is removed, as shown in FIG. 6, the coupling rod 131 is moved in a direction of the stopper 139 by the elastic force of the elastic member 137.

The stopper 139 is coupled to the end of the coupling rod 131, to which the link 135 is not coupled. The stopper 139 has a larger diameter than that of the elastic member 137, thus preventing the elastic member 137 from being removed from the coupling rod 131.

As shown in FIG. 3, the angle fixing unit 140 includes a pair of fan-shaped plates attached to the left and right sides of the frame coupling block 110, and a pair of rectangular plates respectively coupling front and rear edges of the fan-shaped plates to each other. One or more angle fixing holes 141 are formed along the arc of each fan-shaped plate, so that the angle fixing rods 133 can be inserted into the angle fixing holes 141.

The angle fixing unit 140 is welded to the outer surface of the frame coupling block 110, thus preventing the angle fixing unit 140 from being moved forwards and backwards by the pressure of the saddle coupling post 120, to which the angle fixing unit 140 is coupled via the angle adjusting unit 130.

Figure 9:
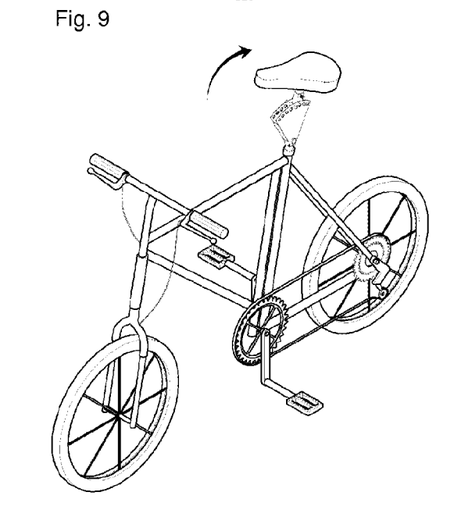
FIG. 9 is a view showing the state in which the saddle of FIG. 1 is tilted backwards.
Figure 10:
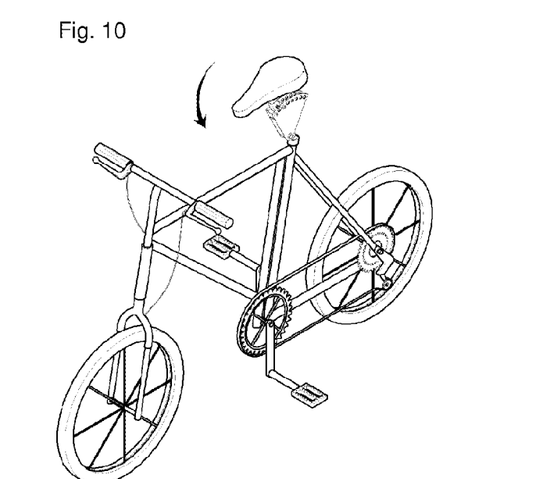
FIG. 10 is a view showing the state in which the saddle of FIG. 1 is tilted forwards.

The bicycle having the saddle angle adjusting device according to the first embodiment of the invention is operated as follows. That is, in the state in which the saddle coupling post 120 is rotated backwards, as shown in FIG. 9, the angle adjusting unit 130 may be inserted into an associated angle fixing hole 141 in the angle fixing unit 140. By adjusting the angle of the saddle in this way, a rider can assume a natural posture even if his or her arms are long in proportion to the length of his or her legs, and even if he or she rides on a downhill road. Meanwhile, in the state in which the saddle coupling post 120 is rotated forwards, as shown in FIG. 10, the angle adjusting unit 130 may be inserted into an associated angle fixing hole 141 hi the angle fixing unit 140. By adjusting the angle of the saddle in this way, a rider can assume a natural posture even if his or her arms are short in proportion to the length of his or her legs, or even if he or she rides on an uphill road or runs at high speeds.

Figure 11:
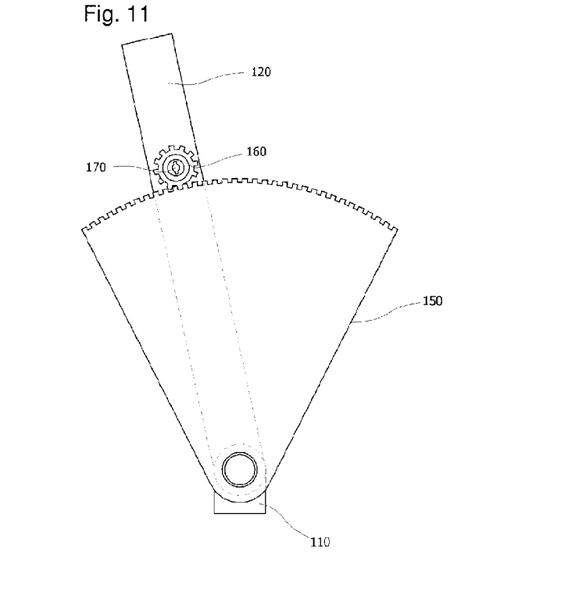
FIG. 11 is a detailed perspective view showing an angle adjusting device for a bicycle saddle, according to a second embodiment of the present invention.

FIG. 11 shows an angle adjusting device 100 for a bicycle saddle, according to a second embodiment of the present invention. As shown in the drawing, the angle adjusting device 100 includes a frame coupling block 110, a saddle coupling post 120, an angle adjustment gear 160, a toothed angle fixing plate 150, and a gear holding screw 170.

Since the frame coupling block 110 and the saddle coupling post 120 are the same as those of the first embodiment, they will not be described herein.

The angle adjustment gear 160 is a toothed wheel which has teeth of a predetermined size, and a hole the same size as the through hole of the saddle coupling post 120 is formed in the central portion of the toothed wheel.

Figure 12:
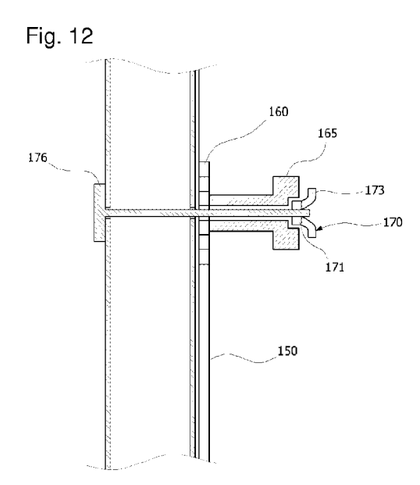
FIG. 12 is a front sectional view showing the saddle angle adjusting device, according to the second embodiment of the present invention.

As shown in FIG. 12, an angle adjustment knob 165 may protrude from the surface of the angle adjustment gear 160 that is opposite the surface of the angle adjustment gear 160 that is attached to the saddle coupling post 120. The angle adjustment knob 165 is used to rotate the angle adjustment gear 160.

As shown in FIG. 11, the toothed angle fixing plate 150 comprises a fan-shaped plate. Teeth are formed along the arc of the fan-shaped plate, and engage with the angle adjustment gear 160.

The gear holding screw 170 passes through the hole which is formed in the central portion of the angle adjustment gear 160 and the through hole in the saddle coupling post 120, thus fastening the angle adjustment gear 160 to the saddle coupling post 120. When the gear holding screw 170 is tightened, the angle adjustment gear 160 is in closer contact with the saddle coupling post 120, so that it is impossible to rotate the angle adjustment gear 160.

As shown in FIG. 12, the gear holding screw 170 is fastened to the saddle coupling post 120. The gear holding screw 170 may include a fastening bolt 176, a rotary nut 171, and wings 173. The fastening bolt 176 passes through the saddle coupling post 120, the angle adjustment gear 160, and the angle-adjusting knob 165. The rotary nut 171 is fitted onto the fastening bolt 176. As the rotary nut 171 rotates, the angle adjustment gear 160 and the angle-adjusting knob 165 come into close contact with the saddle coupling post 120. The wings 173 are used to rotate the rotary nut 171.

The surface of the rotary nut 171 comes into close contact with the outer surface of the angle adjustment knob 165, so that the angle adjustment knob 165 is in close contact with the saddle coupling post 120. However, the upper and lower portions of the rotary nut 171 are not in contact with the angle adjustment knob 165. This construction prevents the angle adjustment knob 165 from rotating together with the rotary nut 171 when the rotary nut 171 rotates.

The wings 173 are provided on the surface of the rotary nut 171, which is opposite the surface contacting the angle adjustment knob 165, and are formed to be long in a vertical or horizontal direction in order to easily transmit external rotating force to the rotary nut 171. As shown in FIG. 12, the vertically or horizontally long portions are spaced apart from the rotary nut 171 by a predetermined interval, thus preventing the angle adjustment knob 165 from rotating together with the wings 173 when the wings 173 rotate. When the angle adjustment knob 165 is brought into close contact with the saddle coupling post 120 by the rotary nut 171, the long portions do not contact the knob 165.

The saddle angle adjusting device 100, according to the second embodiment of the present invention, will be operated as follows. That is, when the gear holding screw 170 is loosened to make it possible to rotate the angle adjustment gear 160, the saddle coupling post 120 may move forwards and backwards. Thereby, it is possible to set the saddle coupling post 120 to a desired angle. When the gear holding screw 170 is tightened at the desired angle, the angle fixing gear 160 is held at that position. At this time, the teeth of the angle adjustment gear 160 engage with the teeth of the toothed angle fixing plate 150, thus holding the saddle coupling post 120 at the desired angle.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A saddle angle adjusting device for a bicycle having a height adjustment unit between a frame and a saddle, the saddle angle adjusting device comprising:
    a frame coupling block coupled at a lower end thereof to an upper portion of the height adjustment unit;
    a saddle coupling post coupled at a lower end thereof to an upper end of the frame coupling block in such a way that the saddle coupling post rotates forwards and backwards, and coupled at an upper end of the saddle coupling post to the saddle, with a through hole formed in an upper portion of the saddle coupling post;
    an angle fixing unit comprising a pair of fan-shaped plates attached to left and right sides of the frame coupling block, and a pair of rectangular plates respectively coupling front and rear edges of the fan-shaped plates to each other, with a plurality of holes formed along an arc of each of the fan-shaped plates; and
    an angle adjusting unit coupled to the saddle coupling post, a predetermined part of the angle adjusting unit being detachable from the holes in the angle fixing unit to control rotation of the saddle coupling post,
    wherein the angle adjusting unit comprises:
        a coupling rod coupled to the saddle coupling post;
        one or more angle fixing rods inserted into the angle fixing unit;

a link for connecting an end of the coupling rod to an end of each of the one or more angle fixing rods in such a way that the coupling rod is parallel to the one or more angle fixing rods;

an elastic member, which is made of a material having elasticity, and is fitted over the coupling rod; and a stopper coupled to an end of the coupling rod, which is not connected to the link, and supporting the elastic member, wherein the angle adjusting unit is operated so that, when the coupling rod, coupled to the saddle coupling post, is moved in a direction of the link by external force so that the one or more angle fixing rods connected to the link are removed from the angle fixing unit, the saddle coupling post moves forwards and backwards to be adjusted to a desired angle, and, when the force moving the coupling rod is eliminated at a desired angle, the coupling rod is moved in a direction of the stopper by elastic force of the elastic member, and simultaneously, the one or more angle fixing rods are inserted into the angle fixing unit, thus holding the saddle coupling post at the desired angle.

2. The saddle angle adjusting device according to claim 1, wherein the coupling rod is inserted into the through hole in the saddle coupling post, a first end of the coupling rod being coupled to the link, and a second end of the coupling rod being coupled to the stopper, the elastic member being positioned between the stopper and the saddle coupling post in such a way as to surround the coupling rod.

3. The saddle angle adjusting device according to claim 1, wherein the link comprises:

a horizontal bar for connecting the one or more angle fixing rods to each other; and a vertical bar for connecting the horizontal bar to the coupling rod.

* * * * *